United States Patent
Oh et al.

(10) Patent No.: US 7,720,035 B2
(45) Date of Patent: May 18, 2010

(54) SYSTEM FOR MEDIATING CONVERGENCE SERVICES OF COMMUNICATION AND BROADCASTING USING NON-COMMUNICATIVE APPLIANCE

(75) Inventors: Hyun Woo Oh, Daejeon (KR); Kee Seong Cho, Daejeon (KR); Hyun Soon Shin, Daejeon (KR); Eung Ha Kim, Daejeon (KR); Hwa Suk Kim, Daejeon (KR); Sung Jin Moon, Daejeon (KR); Hyun Jin Lee, Daejeon (KR); Tae Ho Yeam, Daejeon (KR); Byung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 377 days.

(21) Appl. No.: 11/177,909

(22) Filed: Jul. 7, 2005

(65) Prior Publication Data

US 2006/0133336 A1 Jun. 22, 2006

(30) Foreign Application Priority Data

Dec. 17, 2004 (KR) .................... 10-2004-0108149

(51) Int. Cl.
*H04W 4/00* (2009.01)
(52) U.S. Cl. .................... 370/338; 455/78; 340/825.72; 709/229; 725/2; 725/39; 725/40; 725/48; 725/58; 725/46; 370/485; 370/486; 370/493
(58) Field of Classification Search .................. 370/338, 370/485, 486, 493; 455/78; 340/825.72; 709/229; 725/2, 39, 40, 46, 48, 58
See application file for complete search history.

(56) References Cited

U.S. PATENT DOCUMENTS 5,675,375 A * 10/1997 Riffee ...................... 348/14.1

(Continued)

FOREIGN PATENT DOCUMENTS

KR 10-0201550 6/1999

(Continued)

OTHER PUBLICATIONS

Kazunori Sugiura, "Portable Video Conference Tool using Notebook Computers and DV Camera", Proceedings of the Sixth IASTED Int'l Conf., Internet and Multimedia Systems and Applications, Aug. 12-14, 2002, Kaua'i, Hawaii, USA (pp. 336-341).

*Primary Examiner*—Rafael Pérez-Gutiérrez
*Assistant Examiner*—Nimesh Patel
(74) *Attorney, Agent, or Firm*—Blakely, Sokoloff, Taylor & Zafman LLP (57) ABSTRACT

Provided is an access mediator system for mediating convergence services of communication and broadcasting using a non-communicative appliance. The access mediator system includes: a non-communicative appliance access interface unit performing an interface function so as to converge a non-communicative appliance comprising an interface supporting image and voice multimedia data but not including a communication function; a broadband convergence network access interface unit performing an interface function so as to access a broadband convergence network connected to various service provider servers via wire and wireless interfaces; and a main processor accessing a selected service provider server via the broadband convergence network access interface unit to mediate the selected service provider server and the non-communicative appliance.

19 Claims, 4 Drawing Sheets

U.S. PATENT DOCUMENTS

| | | | |
|---|---|---|---|
| 6,657,957 B1 * | 12/2003 | Cheung et al. | 370/230 |
| 6,781,518 B1 * | 8/2004 | Hayes et al. | 340/825.72 |
| 2002/0080827 A1 * | 6/2002 | Lee | 370/527 |
| 2003/0169860 A1 * | 9/2003 | Chou | 379/88.17 |
| 2003/0177251 A1 * | 9/2003 | Suzuki et al. | 709/229 |
| 2003/0229898 A1 * | 12/2003 | Babu et al. | 725/87 |
| 2004/0063405 A1 * | 4/2004 | Song | 455/41.2 |
| 2004/0139204 A1 * | 7/2004 | Ergezinger et al. | 709/229 |
| 2007/0198532 A1 * | 8/2007 | Krikorian et al. | 707/10 |

FOREIGN PATENT DOCUMENTS

| | | |
|---|---|---|
| KR | 100226451 B1 | 7/1999 |
| KR | 2003-0001703 | 1/2003 |
| WO | WO 01/56233 A1 | 8/2001 |
| WO | WO 01/67756 A2 | 9/2001 |
| WO | WO 03/058966 A1 | 7/2003 |

* cited by examiner

SYSTEM FOR MEDIATING CONVERGENCE SERVICES OF COMMUNICATION AND BROADCASTING USING NON-COMMUNICATIVE APPLIANCE

CROSS-REFERENCE TO RELATED PATENT APPLICATION

This application claims the benefit of Korean Patent Application No. 10-2004-0108149, filed on Dec. 17, 2004, in the Korean Intellectual Property Office, the disclosure of which is incorporated herein in its entirety by reference.

BACKGROUND OF THE INVENTION

1. Field of the Invention

The present invention relates to an access mediator system mediating convergence services of communication and broadcasting using a non-communicative appliance, and more particularly, to an access mediator system accessing a broadband convergence network using a non-communicative appliance having a multimedia data transmission interface, such as a camcorder, a digital camera, a television, to mediate convergence services of communication and broadcasting so as to provide the convergence services.

2. Description of the Related Art

Conventional portable multimedia systems relate to mobile communication systems including camcorder functions, i.e., convergence systems in which general portable phones include digital camera or camcorder functions. The convergence systems may perform multimedia communication functions using a single system but do not transmit real-time multimedia streaming data such as real-time IP broadcasting.

Conventional portable multimedia players (PMPs) include storages and access an external network to receive multimedia data and store the multimedia data in the storages. Users can carry PMPs and thus play stored data anytime anywhere. The conventional PMPs mainly provide a VoD service and thus cannot support services such as real-time IP broadcasting, video phones, and the like. In other words, according to the conventional techniques, a single system is embodied to provide specific services.

SUMMARY OF THE INVENTION

The present invention provides an access mediator system into which a non-communicative appliance such as a camcorder, a digital camera, a TV, a PMP, or an MP3 player is converged via an interface such as an IEEE1394 interface, a universal serial bus (USB) interface, or an AV In/Out interface, so as to mediate various convergence services of communication and broadcasting such as real-time IP broadcasting, VoD, video phones, VoIP, network storage, One-to-One, or Download and store (DnS) in a broadband convergence network.

The present invention also provides an access mediator system including an access interface such as a WLAN or Hpi and accessing a broadband convergence network anytime anywhere so as to mediate convergence services of communication and broadcasting.

The present invention also provides an access mediator system mediating various convergence services of communication and broadcasting using a non-communicative appliance such as a camcorder, a digital camera, a TV, a PMP, or an MP3 player so as to improve the practical use of the non-communicative appliance and provide high-quality convergence services of communication and broadcasting.

According to an aspect of the present invention, there is provided an access mediator system including: a non-communicative appliance access interface unit performing an interface function so as to converge a non-communicative appliance including an interface supporting image and voice multimedia data but not comprising a communication function; a broadband convergence network access interface unit performing an interface function so as to access a broadband convergence network connected to various service provider servers via wire and wireless interfaces; and a main processor accessing a selected service provider server via the broadband convergence network access interface unit to mediate the selected service provider server and the non-communicative appliance.

According to another aspect of the present invention, there is provided an access mediator system including: a non-communicative appliance access interface module converging a non-communicative appliance to perform an interface function with the non-communicative appliance; a non-communicative access identification module automatically identifying the convergence of the non-communicative appliance; a broadband convergence network access authentication module authenticating an authority of a user to access a broadband convergence network; if the access to the broadband convergence network is authenticated, a broadband convergence network interface module performing an interface function with the broadband convergence network; a profile management module managing a profile comprising information as to the non-communicative appliance converged into the non-communicative appliance access interface module, information as to the user, and a list of convergence services of communication and broadcasting; a service selection module selecting a list of convergence services of communication and broadcasting provided between the non-communicative appliance and the broadband convergence network via the profile management module and providing the list to the user; and a service mediation module mediating the convergence services between the service provider server and the non-communicative appliance.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an access mediator system mediating convergence services of communication and broadcasting using a non-communicative appliance according to an exemplary embodiment of the present invention will be described in detail with reference to the attached drawings.

Figure 1:
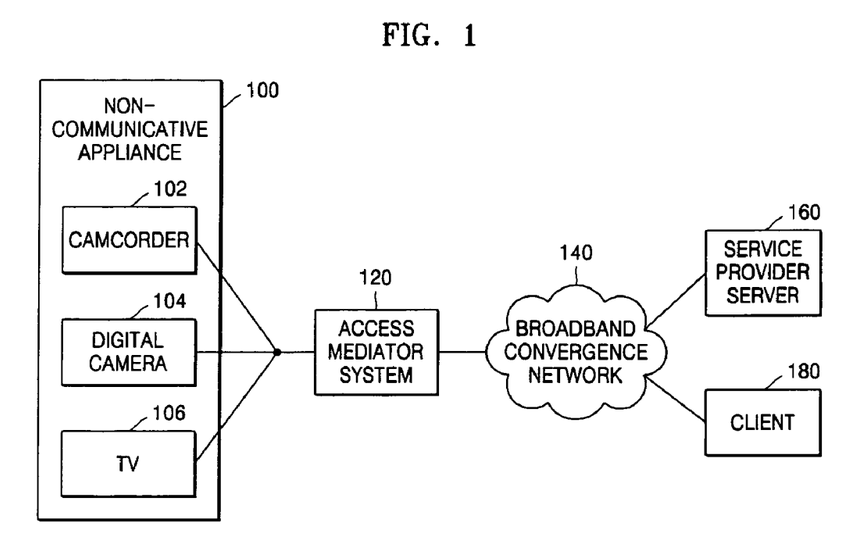
FIG. 1 is a view illustrating the configuration of an access mediator system mediating convergence services of communication and broadcasting using a non-communicative appliance according to an exemplary embodiment of the present invention.

FIG. 1 is a view illustrating the configuration of an access mediator system mediating convergence services of communication and broadcasting using a non-communicative appliance according to an exemplary embodiment of the present invention.

Examples of personal multimedia devices include cellular phones, personal digital assistants (PDAs), camcorders, digital cameras, notebooks, TVs, and the like. The camcorders, the digital cameras, and the TVs cannot perform communication. In the present invention, such devices are classified as non-communicative appliances. Such a non-communicative appliance includes external interfaces, i.e., an IEEE1394 interface, a USB interface, and an AV interface, and internal interfaces, i.e., an image input and/or output interface and a voice input and/or output interface.

Figure 2:
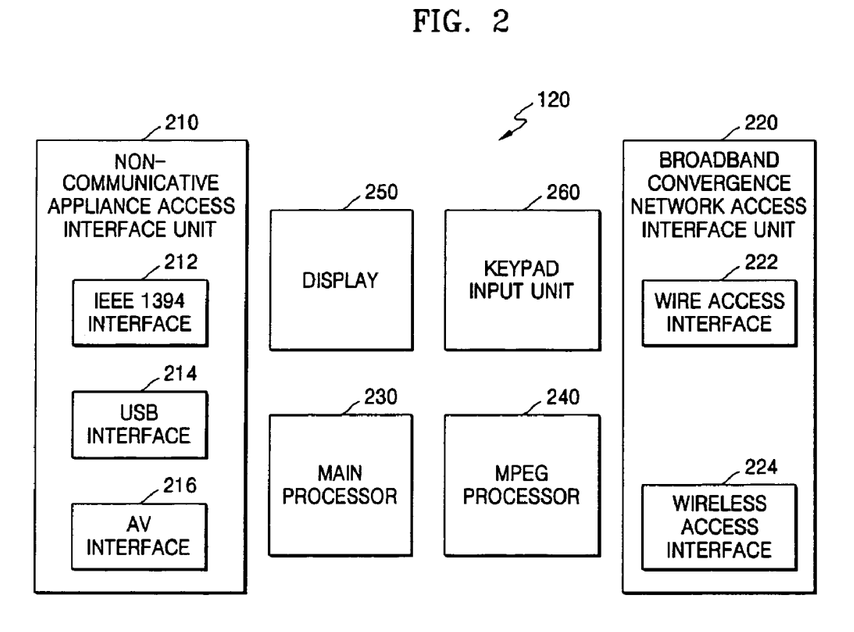
FIG. 2 is a detailed block diagram of the access mediator system shown in FIG. 1.

Referring to FIG. 1, a user of an access mediator system 120 converges a personal non-communicative appliance such as a camcorder 102, a digital camera 104, or a TV 106 into the access mediator system 120 via an IEEE1394 interface 212 shown in FIG. 2, a USB interface 214 shown in FIG. 2, or an AV interface shown in FIG. 216.

The IEEE1394 interface 212 is required to converge the camcorder 102.

The access mediator system 120 uses the IEEE1394 interface 212 to control the camcorder 102 and receive image and voice data from the camcorder 120.

The USB interface 214 is used to converge the digital camera 104 and a USB mouse (not shown) and converges into the digital camera 104 to shift photograph data stored in the digital camera 104 to a storage popfolder on a network. The USB mouse controls a web page output via the TV 106 to select a necessary service.

The AV interface 216 is required to converge the camcorder 102 or the TV 106. Thus, the AV interface 216 converges into the camcorder 102 to receive image data from the camcorder 102 or converges into the TV 106 to output web data or VoD streaming data received from a server of a broadband convergence network 140 to the TV 106.

The access mediator system 120 may access the broadband convergence network 140 via a wire access interface 222 shown in FIG. 2 or a wireless access interface 224 shown in FIG. 2.

A broadband convergence network access interface 220 supports a 10/100 Mbps Ethernet interface via the wire access interface 222 and an IEEE 802.11a/b/g interface via the wireless access interface 224. The broadband convergence network access interface 220 supports an HPi interface that is a future portable Internet standard via the wireless access interface 224.

The access mediator system 120 converges a non-communicative appliance 100 thereinto to access a service provider server 160, for example, a real-time IP broadcasting service provider server, a VoD service provider server, a web surfing service provider server, a network storage service provider server, or the like, so as to transmit and/or receive corresponding data according to a corresponding service.

The access mediator system 120 also mediates a video phone, VoIP, or One-to-One service between the broadband convergence network 140 and a client 180.

FIG. 2 is a detailed block diagram of the access mediator system 120 shown in FIG. 1. Referring to FIG. 2, the access mediator system 120 includes a non-communicative appliance access interface unit 210, a broadband convergence network access interface unit 220, a main processor 230, an MPEG processor 240, a display 250, and a keypad input unit 260. The non-communicative appliance access interface unit 210 performs an interface function so as to converge the non-communicative appliance 100. The broadband convergence network access interface unit 220 is used to access the broadband convergence network 140. The main processor 230 drives the access mediator system 120. The MPEG processor 240 reduces load imposed on the main processor 230 and performs MPEG-4 encoding and/or decoding. The display 250 outputs user authentication and service lists. The keypad input unit 260 is used to perform a key input for authenticating a user and select services.

The non-communicative appliance access interface 210 includes the IEEE1394 interface 212, the USB interface 214, and the AV interface 216.

In detail, the AV interface 216 includes an AV IN interface and an AV OUT interface.

The broadband convergence network access interface unit 220 includes the wire access interface 222 and the wireless access interface 224 used to access the broadband convergence network 140. The wire access interface 222 may be a LAN, and the wireless access interface 224 may be a WLAN or an HPi.

When a power is applied to the access mediator system 120, a user authentication process for the use of the access mediator system 120 is displayed on the display 250. Here, the display 250 may be a LCD. The user performs user authentication for the use of the access mediator system 120.

If the digital camera 104 of the non-communicative appliance 100 is converged into the access mediator system 120 via the USB interface 214, the access mediator system 120 identifies the USB interface 214 and the digital camera 104 and displays a usable service list based on a profile. When the user selects a service using the keypad input unit 260, the access mediator system 120 tries to access the broadband convergence network 140 to mediate the selected service. Here, if MPEG-4 encoding and/or decoding is required for the corresponding service, the access mediator system 120 transmits corresponding data to perform encoding and/or decoding.

A case of providing a real-time IP broadcasting service using a camcorder will now be described in more detail.

The camcorder 102 of the non-communicative appliance 100 accesses the access mediator system 120.

Here, the camcorder 102 accesses the access mediator system 120 using the IEEE1394 interface 212.

The access mediator system 120 identifies the access of the IEEE1394 interface 212, reads characteristics of a corresponding user, the camcorder 102, and the characteristics of the camcorder 102 from a profile, and outputs a service list with which the user is to be provided using the camcorder 102.

The user selects an output usable service. In other words, if the user desires a real-time IP broadcasting service, the user selects a real-time IP broadcasting server and tries to access the real-time IP broadcasting server through a keypad input.

If the user completely accesses the real-time IP broadcasting server, the access mediator system 120 controls the camcorder 102 to receive real-time multimedia data.

The multimedia data received from the camcorder 102 is encoded by an MPEG-4 codec and then transmitted to the real-time IP broadcasting server via the broadband convergence access interface 220. The real-time IP broadcasting server re-transmits streaming data received from a broadcasting server to transmit corresponding broadcasting to a user desiring to see the corresponding broadcasting.

Figure 3:
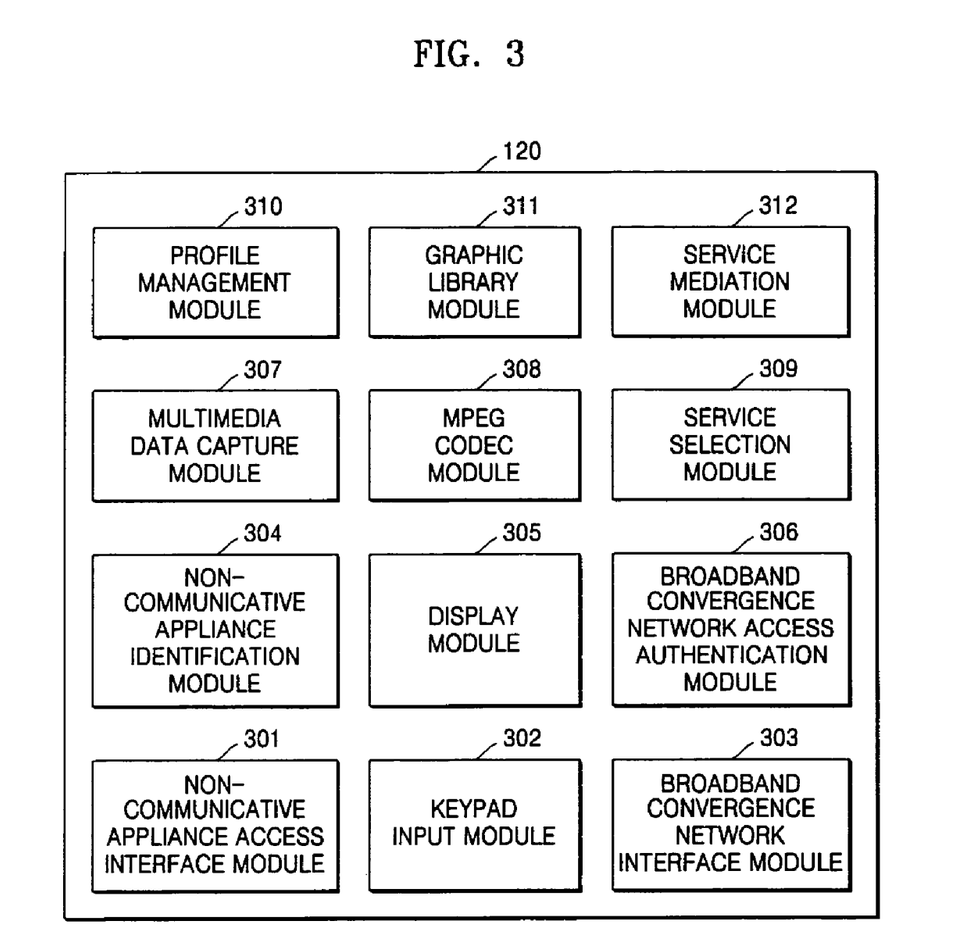
FIG. 3 is a detailed block diagram illustrating functions of the access mediator system shown in FIG. 1.

FIG. 3 is a detailed block diagram illustrating functions of the access mediator system 120 shown in FIG. 1. Referring to FIG. 3, the access mediator system 120 includes a non-communicative appliance access interface module 301, a keypad input module 302, a broadband convergence network interface module 303, a non-communicative appliance access identification module 304, a display module 305, a broadband convergence network access authentication module 306, a multimedia data capture module 307, an MPEG codec module 308, a service selection module 309, a profile management module 310, a graphic library module 311, and a service mediation module 312. The keypad input module 302 is used to select a service and a server. The non-communicative appliance access identification module 304 senses the convergence of the non-communicative appliance 100 into the access mediator system 120 and automatically identifies an appliance name of the converged non-communicative appliance 100, a used interface, and the characteristics of the converged non-communicative appliance 100 via an auto-identification module. The display module 305 is used to output the user authentication and the service list. The multimedia data capture module 307 receives multimedia data from the non-communicative appliance 100. The MPEG codec module 308 MPEG-4 encodes and/or decodes multimedia data captured from the non-communicative appliance 100 and multimedia data received from the broadband convergence network 140. The service selection module 309 is used to select a service based on the profile. The profile management module 310 generates, revises, and deletes a profile of an access terminal, user, and a service and provides base information so that a service selector extracts a service list that can be mediated. The graphic library module 311 is used to display multimedia data an access mediator system receives from a network, via an AV In/Out interface, the access mediator system not including an additional graphic card. The service mediation module 312 is used to converge a non-communicative appliance so as to mediate various services such as real-time IP broadcasting, VoD, VoIP, video phone, web surfing, One-to-One, network storage, DnS, and the like. The keypad input module 302 is used by the user to try to input a keypad input to select a desired service list output to the display module 305. The keypad input is achieved by inputting a corresponding service number of the service list or server information necessary for providing the corresponding service.

The broadband convergence network access interface module 303 supports the 10/100 Mbps Ethernet interface as a wire interface of a convergence interface of the broadband convergence network 140 and the IEEE 802.11a/b/g interface as a wireless interface of the convergence interface. The broadband convergence network access interface module 303 supports the HPi interface that is a future Internet standard as the wireless interface.

The non-communicative appliance access identification module 304 senses the convergence of the non-communicative appliance 100 into the access mediator system 120 and automatically identifies the appliance name of the converged non-communicative appliance 100, the used interface, and the characteristics of the converged non-communicative appliance 100 via the auto identification module.

The display module 305 corresponds to a text LCD of the access mediator system 120 and outputs the service list extracted by the service selection module 309 to the user so that the user selects the service list.

In the case of a real-time IP broadcasting service, the MPEG codec module 308 MPEG-4 encodes the multimedia streaming data via the MPEG-4 codec before the multimedia streaming data is transmitted to the broadband convergence network 140. In the case of a VoD service, the MPEG codec module 308 MPEG-4 decodes the MPEG-4 encoded streaming data received from the broadband convergence network 140 and transmits the MPEG-4 decoded streaming data to the display module 305.

The service selection module 309 extracts a convergence service list of communication and broadcasting the user can use using a corresponding non-communicative appliance based on the profile information received from the profile management module 310 and outputs the convergence service list to the display module 305 so that the user selects the convergence service list.

The profile management module 310 manages profiles of the characteristics of the non-communicative appliance 100 converged into the access mediator system 120, the user, and services to provide the base information through which the service selection module 309 can extract a service list to be mediated.

The graphic library module 311 requires a graphic library such as a frame buffer so that the access mediator system 120 does is an embedded device not including an additional graphic card and displays image data on an output window such as a TV, a camcorder, or the like. The access mediator system 120 uses the MPEG processor 240 including a PCI and AV interface unit 216 and uses the graphic library including a frame buffer, a multimedia player, and a web browser so that the main processor 230 outputs image data via an interface of the MPEG processor 240.

Figure 4:
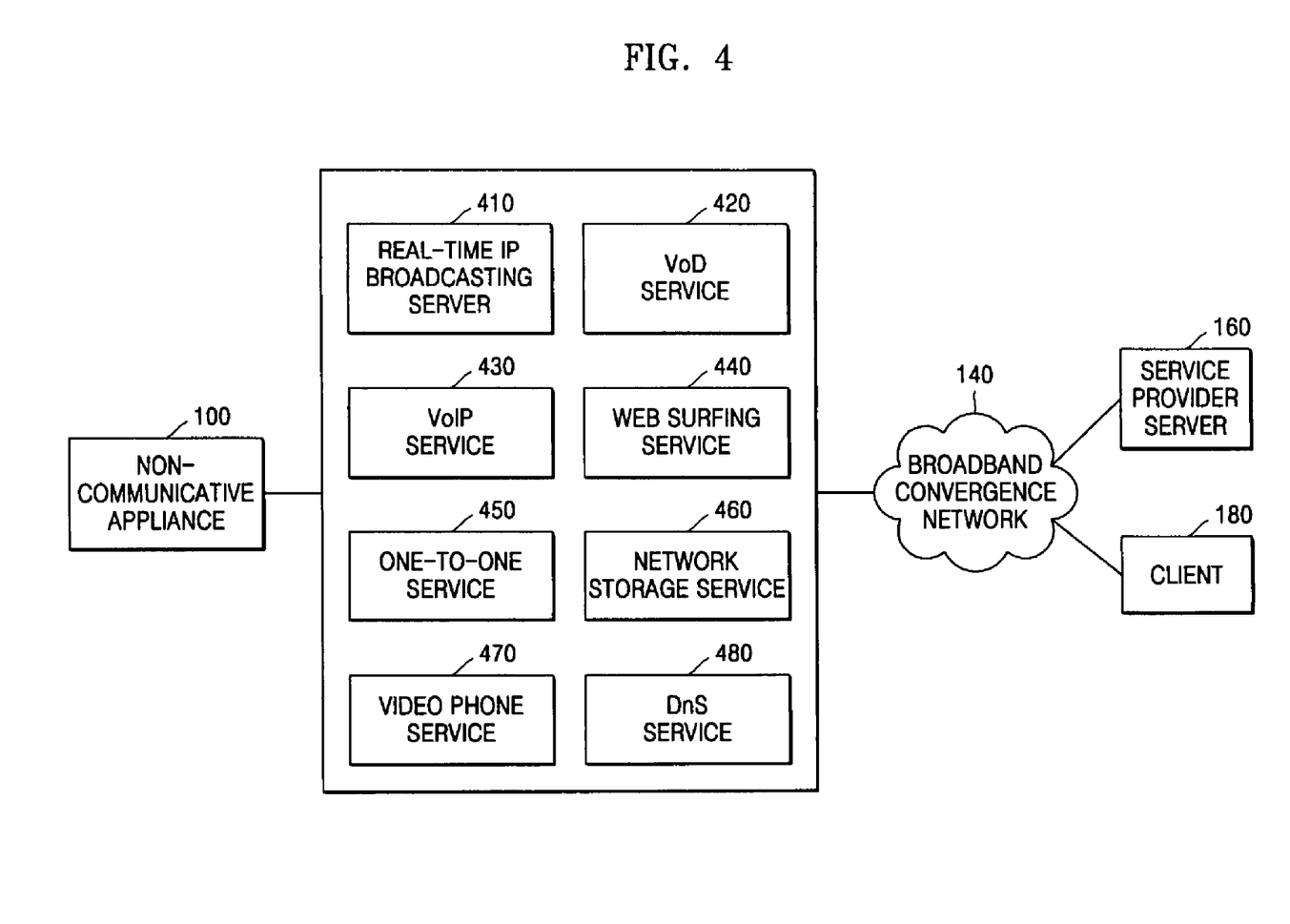
FIG. 4 is a view illustrating services provided through the convergence of the non-communicative appliance 100 into the access mediator system 120 shown in FIG. 1.

FIG. 4 is a view illustrating services provided through the convergence of the non-communicative appliance 100 into the access mediator system 120 shown in FIG. 1. Referring to FIG. 4, the access mediator system 120 is a device converging the non-communicative appliance 100 thereinto to mediate various services between a server and a user. The access mediator system 120 provides a convergence service 400 of communication and broadcasting. The convergence service 400 includes a real-time IP broadcasting service 410, a VoD service 420, a VoIP service 430, a web surfing service 440, a One-to-One service 450, a network storage service 460, a video phone service 470, a DnS service 480, and the like.

The real-time IP broadcasting service 410 will now be described.

The camcorder 102 is converged into the non-communicative appliance access interface module 301 to photograph data to be broadcast, and the multimedia data capture module 307 captures real-time streaming data from the camcorder 102. The MPEG codec module 308 receives the real-time streaming data from the multimedia data capture module 307, encodes the real-time streaming data, and transmits the real-time streaming data to the real-time IP broadcasting server which has accessed the broadband convergence network access interface module 303. The real-time IP broadcasting server re-transmits the data to be broadcast received from the access mediator system 120 to the client 180 desiring to see broadcast. Such a service is the real-time IP broadcasting service 410.

Next, the VoD service 420 will be described.

The non-communicative appliance access interface module 301 is converged into the TV 106. The access mediator system 120 allows the TV 106 to access a web-based VoD server which has accessed the broadband convergence network access interface module 303. The graphic library module 311 outputs a web page received from a VoD server to the TV 106 via the AV interface 216. The multimedia data received from the VoD server is decoded by the MPEG codec module 308 and then displayed on the TV 106 via the graphic library module 311. Here, the web surfing is mainly controlled by the USB mouse, and corresponding VoD contents are selected through the web surfing and then transmitted to an RTP packet. Such a service is the VoD service 420.

The VoIP service 430 will be described.

The access mediator system 120 includes a microphone and a speaker to support the VoIP service. Initialization of the VoIP service is performed based on the profiles or may be performed by the user via the keypad input module 302 and the display module 305.

The web surfing service 440 will be described.

The access mediator system 120 uses the AV interface 216 and the USB interface 214. The AV interface 216 converges a displayable AV device, and the USB interface 214 converges a mouse to control the web page.

The One-to-One service 450 will be described.

The One-to-One service 450 is used for accident management, direct dealing, or the like and different from the video phone service 470 in terms of service characteristics. For example, if the One-to-One service 450 is used to show the external appearance of an accident car to the staff of an insurance company in real-time, the staff of the insurance company may see an image of the accident car to solicit an image of another part of the accident car to a user via voice or short sentence massages. The voice messages of the staff of the insurance company are output via the VoIP service, and the short sentence messages are output via the display module 305. A seller provides image information as to a product via the One-to-One service 450, and a buyer sees the image information as to the product of the seller to solicit additional solicitation matters via voice message of the One-to-One service 450.

The network storage service 460 will be described.

Photographs are taken of using the digital camera 104 of the non-communicative appliance 100. Next, the digital camera 104 is converged into the non-communicative appliance access interface module 301 of the access mediator system 120 using the USB interface 214. The access mediator system 120 accesses a network storage popfolder through the broadband convergence network 140 via the broadband convergence network interface module 303 to shift photograph data of the digital camera 104 to the network storage popfolder.

The video phone service 470 will be described.

Image and voice are received using the camera 102 and a microphone of the camcorder 102 converged into the non-communicative access interface module 301 via the video phone service 470. The multimedia data capture module 307 of the access mediator system 120 captures multimedia data, and the MPEG codec module 308 encodes the multimedia data. The access mediator system 120 transmits the encoded multimedia data to the client 180 accessing the broadband convergence network 140 via the broadband convergence network interface module 303 using the video phone service 470. An image and voice of the client 180 are transmitted to the access mediator system 120 via the broadband convergence network interface module 303. The received encoded data is decoded via the MPEG codec module 308 to output the image and the voice of the client 180 to the camcorder 102 converged into the non-communicative appliance access interface module 301. The access mediator system 120 may use a microphone and a speaker thereof.

The DnS service 480 will be described.

For the DnS service 480, a USB storage or an AV In storage is converged into the non-communicative appliance access interface module 301 of the access mediator system 120. Multimedia data, such as education broadcasting provided by an education broadcasting provider server connected to the broadband convergence network interface module 303, is downloaded and then stored in the USB storage or the AV In storage converged into the non-communicative appliance access interface module 301.

Figure 5:
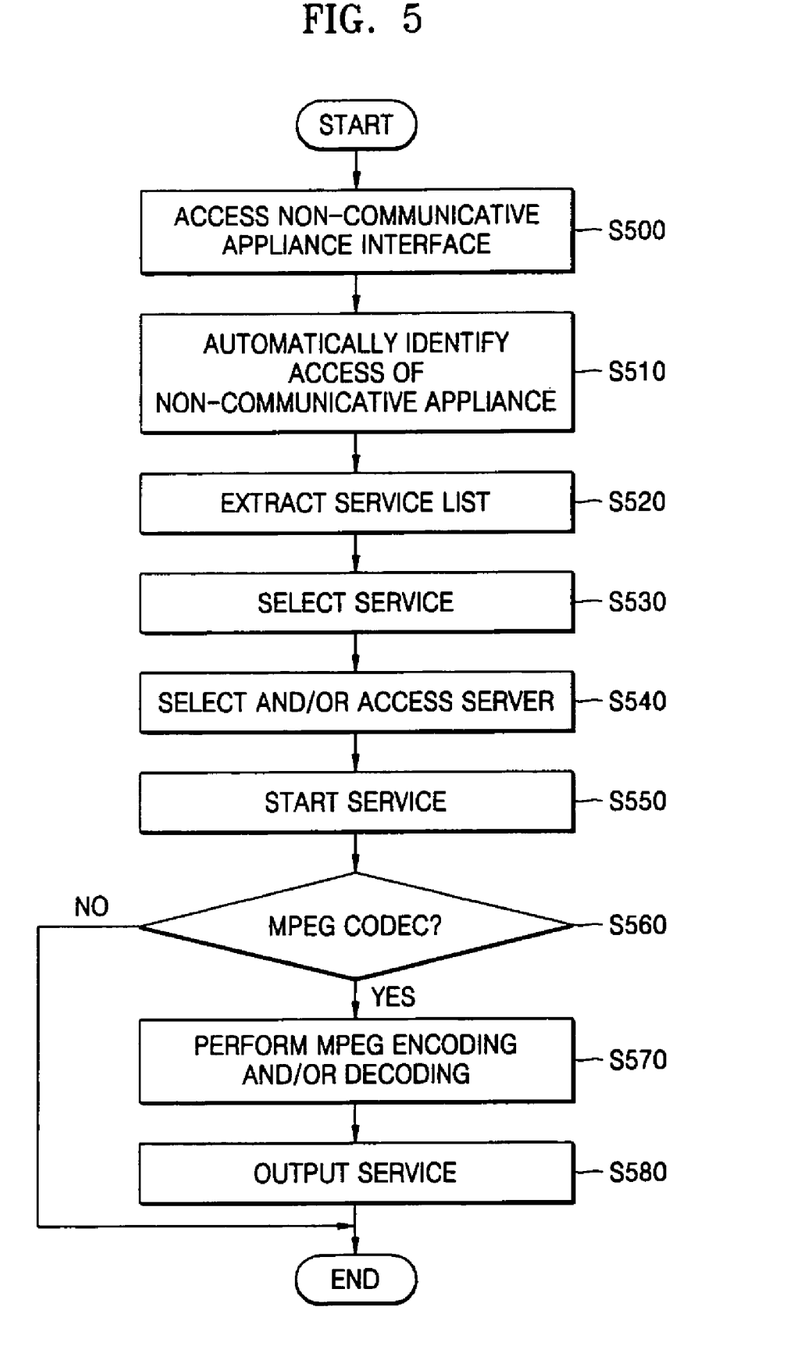
FIG. 5 is a flowchart of a method of mediating various convergence services of communication and broadcasting by converging a non-communicative appliance into an access mediator system according to an exemplary embodiment of the present invention.

FIG. 5 is a flowchart of a method of mediating various convergence services of communication and broadcasting by converging a non-communicative appliance into an access mediator system according to an embodiment of the present invention. Referring to FIG. 5, in operation S500, a power is applied to the access mediator system 120, and the non-communicative appliance 100 accesses the non-communicative appliance access interface module 301.

In operation S510, the communicative appliance access identification module 304 automatically identifies the access of the non-communicative access identification module 304.

In operation S520, a service list, which can be received using a corresponding non-communicative appliance, is extracted based on profiles of the non-communicative appliance 100, the characteristics of the non-communicative appliance 100, a user, and services.

In operation S530, the service list is output via the display module 305, and the user selects a service the user desires to be provided with from the service list.

In operation S540, the user selects and accesses the service provider server 160 corresponding to the selected service.

If the user succeeds in accessing the service provider server 160 via the broadband convergence network 140, in operation S550, the corresponding service is started.

In operation S560, a determination is made as to whether the MPEG codec module 308 is necessary for mediating the service.

If it is determined in operation S560 that the MPEG codec module 308 is necessary for mediating the service, the process proceeds to operation S570. If it is determined in operation S560 that the MPEG codec module 308 is not necessary for mediating the service, the process ends.

In operation S580, MPEG encoding and/or decoding are performed via the MPEG codec module 308 of the access mediator system 120.

In operation S580, the MPEG encoded data is transmitted to a corresponding service provider server and the user via the broadband convergence network 140, and the MPEG decoded data is output to an AV appliance including an AV In interface via an AV Out interface.

If the above service is successfully performed, the service is ended.

As described above, the access mediator system 120 automatically identifies of the convergence of the non-communicative appliance 100 thereinto and outputs a service list the access mediator system 120 can mediate to the user based on profiles of a converged interface, a converged appliance, and the user. Here, if the user selects a service the user can be provided with via the access mediator system 120, the access mediator system 120 accesses an external network to mediate the corresponding service. If necessary, the access mediator system 120 encodes and/or decodes multimedia data and provides the encoded and/or decoded data to the user. Also, the access mediator system 120 provides mobility to the user via a wireless interface and thus can mediate various convergence services anytime in the ubiquitous environment.

As described above, in an access mediator system for mediating convergence services of communication and broadcasting using a non-communicative appliance according to the present invention, a non-communicative appliance including an interface supporting a multimedia service but not including a communication function, such as a camcorder, a digital camera, a TV, a PMP, or a MP3 player, can be converged into the access mediator system. Thus, the access mediator system can access various servers and a client having accessed a broadband convergence network via a broadband convergence network access interface unit to mediate various convergence services of communication and broadcasting such as real-time IP broadcasting, VoD, VoIP, web surfing, One-to-One, network storage, video phone, or DnS using a non-communicative appliance.

Also, a user of the non-communicative appliance can be provided with mobility using the access mediator system and various services anytime anywhere. The access mediator system enables private IP broadcasting. Thus, various applications such as reports on concerts, religious events, festivals, or the like can be generated. In addition, the access mediator system can be applied to national emergency management, disaster and calamity management, and traffic information systems. The access mediator system can be applied to accident management with an insurance, electric home appliance remote AS, direct transactions of agricultural and marine products, shopping malls of hypermarkets, or the like.

Accordingly, the access mediator system can use a conventional non-communicative appliance to provide various services to users and to generate various applications in terms of industry.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An access mediator system comprising:
  a non-communicative appliance access interface unit performing an interface function so as to converge a non-communicative appliance comprising an interface supporting image and voice multimedia data but not comprising a communication function that allows the non-communicative appliance to connect to a network via a wireless access interface or wired access interface, the non-communicative appliance to provide content to be transmitted, the non-communicative appliance access interface unit to detect the convergence of the non-communicative application and to automatically identify an appliance name of the converged non-communicative appliance;
  a broadband convergence network access interface unit performing an interface function so as to access a broadband convergence network connected to various service provider servers via wire and wireless interfaces, wherein the service provider servers provide communication and broadcasting services; and
  a service selection module for providing to a user a list of communication and broadcasting services provided between the non-communicative appliance and the broadband convergence network and providing the list to the user, wherein the service selection module allows the user to select a desired service and a service provider server which provides the desired service; and
  a main processor accessing the selected service provider server via the broadband convergence network access interface unit to mediate the selected service provider server and the non-communicative appliance and to transmit the content provided by the non-communicative appliance to be re-transmitted by the selected service provider server to a client,
  wherein the access mediator system mediates the content without storing the content.

2. The access mediator system of claim 1, wherein the non-communicative appliance access interface unit comprises at least one of an IEEE1394 interface, a USB interface, and an AV interface.

3. The access mediator system of claim 1, wherein the broadband convergence network access interface unit comprises at least one of a wire access interface and a wireless access interface.

4. The access mediator system of claim 1, further comprising:
  a keypad input unit used to select the service provider server of the various service provider servers providing the desired service.

5. An access mediator system comprising:
  a non-communicative appliance access interface module converging a non-communicative appliance to perform an interface function with the non-communicative appliance the non-communicative appliance comprising an interface supporting image and voice multimedia data and but not comprising a communication function that allows the non-communicative appliance to connect to a broadband convergence network, the non-communicative appliance to provide content to be transmitted;
  a non-communicative access identification module automatically detecting the convergence of the non-communicative appliance and automatically identifying an appliance name of the converged non-communicative appliance;
  a broadband convergence network access authentication module authenticating an authority of a user to access the broadband convergence network;
  if the access to the broadband convergence network is authenticated, a broadband convergence network interface module performing an interface function with the broadband convergence network;
  a profile management module managing a profile comprising information as to the non-communicative appliance converged into the non-communicative appliance access interface module, information as to the user, and a list of convergence services of communication and broadcasting;
  a service selection module for presenting to the user a list of convergence communication and broadcasting services provided between the non-communicative appliance and the broadband convergence network via the profile management module and allowing the user to select a desired service from the list; and
  a service mediation module mediating the convergence services between a service provider server and the non-communicative appliance, the service mediation module to transmit the content provided by the non-communicative appliance to be re-transmitted by the service provider server to a client;
  wherein the access mediator system mediates the content without storing the content.

6. The access mediator system of claim 5, further comprising:
  a display module displaying the service list selected by the service selection module so that the user confirms the service list.

7. The access mediator system of claim 5, further comprising:

a keypad input module outputting a keypad input signal to the main processor so as to select the desired service on the service list displayed by the display module.

8. The access mediator system of claim 5, further comprising:
an MPEG codec module performing MPEG encoding and/or decoding according to the convergence services of communication and broadcasting.

9. The access mediator system of claim 5, further comprising:
if the access mediator system is an embedded system not comprising a graphic card, a graphic library module processing graphics based on the convergence services of communication and broadcasting.

10. The access mediator system of claim 5, further comprising:
a multimedia data capture module capturing multimedia data.

11. The access mediator system of claim 5, further comprising:
an MPEG codec module performing MPEG encoding and/or decoding according to the convergence services of communication and broadcasting;
if the access mediator system is an embedded system not comprising a graphic card, a graphic library module processing graphics based on the convergence services of communication and broadcasting; and
a multimedia data capture module.

12. The access mediator system of claim 5, wherein the convergence services of communication and broadcasting are at least one or more of a real-time IP broadcasting service, a VoD service, a VoIP service, a web surfing service, a One-to-One service, a network storage service, a video phone service, and a DnS service.

13. The access mediator system of claim 12, wherein for the VoD service, the broadband convergence network access interface unit receives VoD streaming data from a VoD server connected to the broadband convergence network, the MPEG codec module receives and decodes the VoD streaming data, and an embedded system not comprising a graphic card outputs the decoded VoD streaming data to an AV appliance converged into the non-communicative appliance access interface module via the graphic library module comprising a virtual frame buffer.

14. The access mediator system of claim 12, wherein for the VoIP service, an image to be transmitted is captured via a camcorder converged into the non-communicative appliance access interface module and then transmitted to a client connected to the broadband convergence network access interface module, and an VoIP session is formed with the client.

15. The access mediator system of claim 12, wherein for the One-to-One service, one-to-one communication is performed between the non-communicative appliance converged into the non-communicative appliance access interface module and the client connected to the broadband convergence network access interface module.

16. The access mediator system of claim 12, wherein for the web surfing service, the broadband convergence network access interface module accesses a web-based server connected to the broadband convergence network to receive a web page, and an embedded system not comprising a graphic card outputs the corresponding web page to an output window of an AV appliance converged into the non-communicative appliance access interface module via the graphic library module.

17. The access mediator system of claim 12, wherein for the video phone service, a video phone session is formed with a client connected via a camcorder converged into the non-communicative appliance access interface module and the broadband convergence network access interface unit, and the video phone service is mediated using a camera and a microphone of the camcorder as input interfaces and an LCD and a speaker of the camcorder as output interfaces.

18. The access mediator system of claim 12, wherein for the network storage service, image and moving picture data stored in a digital camera converged into the non-communicative appliance access interface module is shifted to a storage connected to a broadband convergence network access interface module.

19. The access mediator system of claim 12, wherein for the DnS service, the non-communicative appliance access interface module is converged into a storage of the non-communicative appliance to download multimedia data from a corresponding server connected to the broadband convergence network access interface unit and store the multimedia data in the storage.

* * * * *